US011206669B2

(12) United States Patent
Miller et al.

(10) Patent No.: US 11,206,669 B2
(45) Date of Patent: Dec. 21, 2021

(54) INSPECTION METHOD (71) Applicant: Scheidt & Bachmann GmbH, Mönchengladbach (DE)

(72) Inventors: Norbert Miller, Mönchengladbach (DE); Manfred Feiter, Mönchengladbach (DE); Stephan Bichmann, Aachen (DE); Elmar Noll, Mönchengladbach (DE)

(73) Assignee: Scheidt & Bachmann GmbH, Mönchengladbach (DE)

( * ) Notice: Subject to any disclaimer, the term of this patent is extended or adjusted under 35 U.S.C. 154(b) by 39 days.

(21) Appl. No.: 16/547,702

(22) Filed: Aug. 22, 2019

(65) Prior Publication Data
US 2020/0077379 A1 Mar. 5, 2020

(30) Foreign Application Priority Data
Sep. 4, 2018 (DE) ..................... 10 2018 121 493.6

(51) Int. Cl.
*H04W 72/04* (2009.01)
*G06K 9/62* (2006.01)
(Continued)

(52) U.S. Cl.
CPC ........ *H04W 72/048* (2013.01); *G06K 9/6267* (2013.01); *H04W 12/06* (2013.01);
(Continued)

(58) Field of Classification Search
CPC ...... G06F 7/588; G06K 9/6267; G06Q 50/30; G07B 15/02; G07C 2209/08; G07C 9/21;
(Continued)

(56) References Cited

U.S. PATENT DOCUMENTS 8,544,738 B2 * 10/2013 Delville ............... G07F 7/0893
235/384
8,954,344 B2 * 2/2015 Lishak ................. G06Q 20/349
705/13
(Continued)

FOREIGN PATENT DOCUMENTS

DE   10 2004 061 180 A1   6/2006
DE   10 2014 016 606 A1   5/2016
(Continued)

OTHER PUBLICATIONS

European Patent Office, Extended European Search Report, Application No. 19192541.1, dated Dec. 20, 2019, 10 pages.
(Continued)

*Primary Examiner* — Shah M Rahman
(74) *Attorney, Agent, or Firm* — Sunstein LLP (57) ABSTRACT

An inspection system and method for inspecting a user's entitlement to use a service, in particular a transport service, includes: sending, by a mobile inspection device, at least one first inspection data set during a first transmission phase; receiving, by at least one mobile user terminal to be inspected, the at least one first inspection data set; outputting, by at least one first output module of the mobile user terminal, at least one first inspection feature during the first transmission phase, based on the received first inspection data set and at least one user's entitlement information item available in the mobile user terminal, and outputting, by at least one second output module of the mobile inspection device, at least one first validity feature corresponding to the first inspection data set during the first transmission phase.

15 Claims, 4 Drawing Sheets

(51) Int. Cl.
*H04W 48/14* (2009.01)
*H04W 12/06* (2021.01)
*H04W 48/04* (2009.01)
*G06F 7/58* (2006.01)

(52) U.S. Cl.
CPC ........... *H04W 48/04* (2013.01); *H04W 48/14* (2013.01); *H04W 72/044* (2013.01); *G06F 7/588* (2013.01)

(58) Field of Classification Search
CPC ........... G07C 9/28; G07C 9/29; H04W 12/06; H04W 48/04; H04W 48/14; H04W 72/044; H04W 72/048
See application file for complete search history.

(56) References Cited

U.S. PATENT DOCUMENTS

| | | | |
|---|---|---|---|
| 9,038,896 B2* | 5/2015 | Williams | G07B 11/02 |
| | | | 235/381 |
| 9,373,197 B2* | 6/2016 | Dutta | G06Q 20/326 |
| 10,009,745 B2* | 6/2018 | Somani | G07C 9/28 |
| 10,108,618 B2* | 10/2018 | Vlugt | G07B 15/04 |
| 10,453,067 B2* | 10/2019 | Bergdale | G06Q 20/4016 |
| 10,878,416 B2* | 12/2020 | Lulic | G06Q 20/0855 |
| 2002/0143646 A1* | 10/2002 | Boyden | G06Q 30/08 |
| | | | 705/26.3 |
| 2007/0299722 A1* | 12/2007 | Stoffelsma | G06Q 20/327 |
| | | | 705/13 |
| 2008/0120127 A1* | 5/2008 | Stoffelsma | G07B 15/02 |
| | | | 705/1.1 |
| 2010/0170947 A1* | 7/2010 | Christofferson | G06Q 20/325 |
| | | | 235/382 |
| 2012/0322413 A1* | 12/2012 | Haddad | H04L 63/08 |
| | | | 455/411 |
| 2013/0268304 A1* | 10/2013 | Doshi | G06Q 10/02 |
| | | | 705/5 |
| 2014/0095227 A1 | 4/2014 | Parker et al. | |
| 2015/0262195 A1* | 9/2015 | Bergdale | G07C 9/29 |
| | | | 705/5 |
| 2015/0339658 A1* | 11/2015 | Leroy | G06F 21/31 |
| | | | 705/44 |
| 2016/0078415 A1* | 3/2016 | Ekberg | G06Q 20/38215 |
| | | | 705/75 |
| 2016/0180326 A1 | 6/2016 | Gray et al. | |
| 2017/0046681 A1 | 2/2017 | Dixon et al. | |
| 2017/0316423 A1 | 11/2017 | Inderst et al. | |
| 2019/0379746 A1* | 12/2019 | Huebner | H04L 63/08 |

FOREIGN PATENT DOCUMENTS

| | | | | |
|---|---|---|---|---|
| FR | 3 053 198 A1 | 12/2017 | | |
| WO | WO-2013164579 A1 * | 11/2013 | ............. | G07B 15/04 |

OTHER PUBLICATIONS

Canadian Intellectual Property Office, Office Action, Application No. 3,053,331, dated Oct. 13, 2020, 3 pages.
German Patent Offfice, Office Action, Application No. 10 2018 121 493.6, dated Jul. 16, 2021, 10 pages (in German).

* cited by examiner

INSPECTION METHOD

This application claims priority from German patent application number 10 2018 121 493.6, filed Sep. 4, 2018, the full disclosure of which is hereby incorporated by reference herein in its entirety.

TECHNICAL FIELD

The application relates to an inspection method to inspect a user's entitlement to use a service, in particular a transport service. In addition, the application relates to a system, in particular a transport system, a mobile inspection device, a method for operating a mobile inspection device and a service usage application.

BACKGROUND ART

From prior art inspection methods are known to inspect the user's entitlement to use a service. Such a service includes in the present case in particular a transport service, for example, the use of a transport device, in particular a vehicle (e.g. bus, train, airplane, watercraft etc.), but also other services, such as a participation in a particular event (e.g. concert, theater play, sports event etc.).

In order to acquire a user's entitlement for the use of a transport service with conventional passenger transport systems, a user can, typically before using the transport service, obtain the entitlement, for example, by purchasing a ticket. Exemplary and non-exhaustive user's entitlements for transport systems are single or multiple tickets, as well as time tickets, such as weekly or monthly tickets.

In such systems, an inspection of a user's entitlement may include a physical inspection, for example, by providing for an access gate. The access gate is configured to only allow access to a transport device if a valid user's entitlement has been presented. Alternatively the validity of the user's entitlement is checked by an inspector during the use of the transport service. In the case of such a ticket system, it is particularly important that the user acquires a user's entitlement before using the service and in particular pays for it and carries it with him during the use of the service.

Nowadays, ticket systems are increasingly used for transport services, but also for the above-mentioned event services, in which electronic user's entitlements are purchased and made available. For this purpose, an entitlement in the form of entitlement information item, in particular as an electronic ticket, can be sent to a mobile user terminal of the user. This can then be presented by the user at an access gate and/or inspected by an inspector, for example, by using a mobile inspection device.

For example, a stored ticket can be displayed by a graphical display module in the form of an optical code (e.g. barcode or QR code) that can be read wirelessly by the inspection device. The stored ticket can also be stored in a data memory of the mobile user terminal and can be readable, e.g. via radio communication (e.g. Bluetooth, WLAN or NFC). In particular, this allows a ticket data set to be read and, by the inspection device, compared with permissible reference ticket data sets to determine whether the user is authorized to use a current transport service (for example, does the read ticket data authorize the user to use the present transport device in the present class?). However, the read process and the comparison of the data take a considerable amount of time and also reduce user comfort.

In order to further improve user-friendliness, prior art "ticketless" transport systems, also known as occupancy recording system, are known in which the use of a transport service is detected by suitable detecting means and billed according to its use. In particular, with such a transport system the purchase of the user's entitlement in the form of a ticket before the use of the service can be omitted. It is also possible for previously acquired travel entitlements to be used in occupancy recording systems and for the validity of these travel entitlements to be inspected with regard to the used transport means, the traveled route or also the time point of use.

In general, such a transport system requires the user to register with the system before using a transport service for the first time. With a successful (conventional) registration, a user account for the registered user is created in the transport system, in particular in a background system (also called backend system) of the transport system, in which user data, such as a unique user identifier (ID) of the user, and billing data, e.g. credit card data or account relationships, address data or other information for billing, are stored in the background system.

For a use of a transport service, the registered user carries a (registered) mobile user terminal with him. The transport device to be used by the user comprises a detection unit having a communication module for detecting the presence of the mobile user terminal in the transport device during use of the transport service. For example, presence messages can be exchanged between the mobile user terminal and the detection unit.

To enable this, a service usage application, in particular an occupancy recording application, is usually installed on the mobile user terminal, wherein this application controls the exchange of presence messages in the area liable to pay for the used service.

Before the presence messages can be exchanged, it is normally necessary to activate the occupancy detecting service usage application and to (successfully) logon, in particular to the background system of the transport system. The background system can comprise components within the transport means (e.g. on-board computers), but also components at central locations (e.g. computer centers). If the service usage application is activated, log in and log out can take place automatically at the background system (so-called Be-In-Be-Out-System, "BIBO") or at least partially by at least one user action (so-called Check-In-Be-Out System, "CIBO", or so-called Check-In/Check-Out System, "CICO"). After logging out, the background system and the server, respectively, can then bill the user for the used service, based on the detected usage (e.g. period of use, traveled route, etc.) and the user data stored in the user account.

It is essential for an authorized use of a occupancy detecting system that the mobile user terminal (or the user operating the mobile user terminal) allows the presence of the mobile user terminal in the area liable to pay (e.g. transport device, event area, etc.) to be detected from the beginning to the end of the use of the service, i.e. from an entry into the room to an exit from the room. A user with fraudulent intent can prevent the exchange of the presence messages or the radio signals used for this purpose by, for example, switching off his mobile user terminal, shielding it from radio waves and/or not activating an occupancy recording service usage application.

In order to allow inspecting the authorized use of the service used in an occupancy detecting system as well, a user's entitlement information item may be available in the mobile user terminal. For example, if the logon to the background system was successful, a valid user's entitlement information item may be stored in the form of a respective validity status, while if the logon is not successful, an invalid user's entitlement information item may be available (for example, in the form of a non-existent validity status).

In particular, after a successful logon as described above, a valid user's entitlement information item may be available on the mobile user terminal by storing respective information in a memory module of the user terminal. For example, a respective validity status can be transmitted from the background system to the mobile user terminal in the form of an acknowledgement message. This acknowledgement message can then be stored as a user's entitlement information item in the mobile user terminal.

In order to check the authorized use of a service in an occupancy recording system, inspection methods are required which, in particular on the basis of the available user's entitlement information item, enable a distinction to be made between properly operated and not properly operated, in particular fraudulently operated, mobile user terminals.

From document DE 10 2004 061 180 A1 an inspection method is known, in which all mobile user terminals, which are legitimately and properly, respectively, used in an area liable for pay, which is formed by a transport device, receive an inspection code at the beginning of the inspection by the detecting device of the transport device. Upon reception, in particular a graphical inspection feature is displayed by a first display module of the mobile user terminal based on the received inspection code and the user's entitlement information item available in the user terminal. For example, as a valid inspection feature, a green screen can be displayed by the first display module when a valid user's entitlement information item is available, and as an invalid inspection feature, a red screen can be displayed by the first display module when an invalid user's entitlement information item is available. The inspector can now check the permission to use the service in a simple way, e.g. visually.

It has been recognized as a disadvantage of the known inspection method that this method does not protect against fraud by copying the valid inspection feature. For example, with today's mobile user terminals, such as smartphones, it is possible to take a screenshot (or a screen video recorder sequence) of the screen and transmit this image (or graphical sequence or video sequence) wirelessly to other mobile user terminals. These can then display the received image (or graphical sequence or video sequence), i.e. the valid inspection feature, by the first display module. The inspector or controller will therefore perceive a respective mobile user terminal as valid, although it is an illegitimately used mobile user terminal.

Therefore, the object of the application is to provide an inspection method to inspect a user's entitlement to use a service, in particular a transport service, which enables an improved protection against fraud and, at the same time, offers a high level of user comfort and allows a simple check of a user permission.

SUMMARY OF THE INVENTION

The object is solved according to a first aspect of the application by an inspection method to check a user's entitlement for the use of a service, in particular a transport service. The inspection method includes:

sending, by a mobile inspection device, at least one first inspection data set during a first transmission phase, receiving, by at least one mobile user terminal to be inspected, of the at least one first inspection data set, outputting, by at least one first output module of the mobile user terminal, at least one first inspection feature during the first transmission phase based on the received first inspection data set and at least one user's entitlement information item available in the mobile user terminal, outputting, by at least one second output module of the mobile inspection device, at least one first validity feature corresponding to the first inspection data set during the first transmission phase.

Contrary to the state of the art, according to the application, the security against manipulation is increased by the fact that, an output of correspondingly variable (valid) inspection features by the at least one mobile user terminal to be checked is designed in such a way that copying (e.g. via screenshot or screen video recorder) and forwarding of variable (valid) inspection features is no longer practicable. For this purpose, an inspection device (or the detection unit of the area liable to pay) sends at least one first inspection data set to cause output of correspondingly variable (valid) inspection features by the at least one mobile user terminal to be inspected. For example, receiving a first inspection data set on the mobile user terminals that are validly in use can trigger the (periodic) playback of a first graphical sequence as the first inspection feature. In particular, the first graphical sequence may be designed in such a way that no image sequences are repeated for the expected duration of an inspection process (e.g. up to 10 minutes); it is therefore not practicable for fraud attempts to record the first graphical sequence and forward it to another (fraudulent) user. At the same time, preferably the first graphical sequence is displayed on the mobile inspection device as the first validity feature. This provides an easy to perform and user-friendly inspection process through the inspection method according to the application by enabling to check a user's entitlement by comparing the inspection features and validity features, respectively, output by the at least one mobile user terminal and the at least one mobile inspection device during the respective transmission phase. This inspection is simple and fast for the inspector, in particular if it is based on the similarity, in particular optical similarity, of the inspection feature on the mobile terminal and the validity feature on the inspection equipment.

The essential content of the first inspection data set can in particular be the identification of the variable (valid) inspection features that are to be output on at least one mobile user terminal. The security of the inspection method in accordance with the application may be increased if, after the first inspection data set, a second inspection data set is sent which, after receipt, triggers the (periodic) output of a second graphical sequence as the (valid) second inspection features on the mobile user terminals which are being validly used, which is different from the first graphical sequence. At the same time, a second graphical sequence can be output on the mobile inspection device as a second validity feature. In this case, the duration/transmission phases of the graphical sequences can be significantly shorter. In this embodiment, the non-copyability of the (valid) inspection features cannot be provided by the length (exact) of a sequence, which must be something as long as an inspection process potentially takes, but by outputting several (shorter) inspection features, in particular sequences, preferably simultaneously on the mobile user terminal and the inspection device. According to the application, the (valid) inspection feature can also be formed from static feature attributes (for example, images or colors) if only it is ensured that the feature attributes are changed frequently enough to make copying and forwarding meaningless for an attempted fraud.

A further advantage may be, for example, the use of a sequence of optical patterns which changes over time as an inspection feature and which may have time stamps and/or sequence numbers, whereby the inspection device can continuously send the times and/or sequence numbers which are currently to be displayed to the at least one mobile user terminal. For example, both the inspection device and the mobile user terminal can simultaneously display the referenced optical patterns on their respective output modules.

A further advantage may be, for example, that a sequence of optical patterns changing over time is provided as an inspection feature, which may have time stamps and/or sequence numbers, whereby the inspection device can continuously send these patterns to the at least one mobile user terminal. For example, both the inspection device and the mobile user terminal can simultaneously display these patterns on their respective output modules.

The inspection method can also be advantageously designed in such a way that an automatic timer (of the inspection device) sequentially sends different inspection data sets and thus triggers in particular the sequential output of different graphical sequences as inspection or validity features. It shall be understood that preferably the same inspection features (on valid mobile user terminals used) and validity features (on the mobile inspection device) can be output at the same times.

A further advantageous variant of the inspection method may provide that the inspector triggers the transmission of a further inspection data set by an input to the mobile inspection device, which, according to the above described, causes the validly used user terminals, after receiving the further inspection data set, to output a further inspection feature, in particular in the form of a further graphical sequence (according to the further inspection data set), which differs in at least one feature attribute from the respective previous sequence. At the same time, the mobile inspection device can also be caused to output a similar validity feature, that is, a validity feature that corresponds to the output feature attribute. In other words: the inspector can "toggle" which inspection features the mobile user terminals should output, and the validly used user terminals will follow this command (in real time). Again, it is easy for the inspector to identify the validly used user terminals, and it is pointless for a potential fraudster to want to copy a valid inspection feature.

The sending of at least one inspection data set may be effected by the inspection device of the inspector or, triggered by the inspection device, by the detection unit of the area liable to pay. In any case, it can be decisive that the sending of the at least one inspection data set is carried out in such a way that the at least one inspection data set for the mobile user terminals to be inspected (at least those user terminals which are located in the vicinity of the inspector) is receivable, so that the user terminals to be inspected can display the expected inspection features.

If the sending of the at least one inspection data set is done by the detection unit of the area liable to pay, the at least one inspection data set may be determined by the inspection device of the inspector. In this case, the inspection device may send the at least one inspection data set e.g. wirelessly to the detection unit so that the detection unit sends the inspection data set in a receivable form for the mobile user terminals to be inspected.

If the sending of the at least one inspection data set is done by the detection unit of the area liable to pay, the at least one inspection data set may, alternatively, be determined by the detection unit or by a control unit belonging to the detection unit. In this case, it must be ensured that the inspection device receives at least one inspection data set so that it can output the associated validity feature.

The inspection method according to the application is carried out in particular during an inspection process. The purpose of the inspection method is to check a user's entitlement to use a particular service. This verification may be carried out in particular during the use of the service, but also (immediately) before the use or (immediately) after the use of the service. In the present case, a service is understood to be a transport service or a participation in an event (e.g. concert, theatre, sporting event, etc.).

The inspection method is carried out using a mobile inspection device. The mobile inspection device may comprise at least one communication module, in particular to send the at least one inspection data set via a wireless communication channel. In addition, the inspection device may comprise at least one output module to display the at least two different validity features. Furthermore, the mobile inspection device can optionally be equipped with a scanner module for a conventional inspection in order to read ticket data sets and compare them with stored reference ticket data sets.

A mobile user terminal comprises at least one communication module which is identical to or compatible with the communication module of the mobile inspection device. The communication module of the mobile user terminal is at least configured to receive the inspection data sets sent by the inspection device. In addition, a mobile user terminal may have means for storing a user's entitlement information item and at least one first output module. The output module is at least configured to output inspection features.

Examples and non-exhaustive mobile user terminals are smartphones, tablet computers, mobile game consoles, laptops, netbooks, data glasses, smart watches and similar wearables. Alternatively, a mobile user terminal may be a dedicated ticketing device designed exclusively for a ticketing application.

In accordance with the application, the mobile inspection device or the detection unit of the area liable to pay sends a first inspection data set during a first transmission phase.

In addition, during a second transmission phase, the mobile inspection device or the detection unit of the area liable to pay may send a second inspection data set whose data content is at least partially different from the data content of the first inspection data set.

It shall be understood that the second transmission phase can be followed by at least one further transmission phase, whereby at least one further inspection data set is sent during the at least one further transmission phase. The data content of at least one further inspection data set may at least differ from the data content of the second inspection data set, preferably from the data content of the first and second inspection data sets.

An inspection data set preferably includes at least one inspection instruction executable by the user terminal which, upon receipt by the user terminal, causes an output, by a first output module, of an inspection feature. In particular, a processing means of the user terminal can be used to execute at least one inspection instruction in such a way that a specific inspection feature is output.

According to the application, the output of an inspection feature by the first output module depends on the respective received inspection data set and an available user's entitlement information item. In the case of authorized use of the service, for example, a corresponding validity status may be stored in a memory module of the mobile user terminal as a user's entitlement information item, while in the case of unauthorized use of the service, a respective validity status may be missing. In particular, different inspection features (e.g. valid, semi-valid, invalid) are output for a first inspection data set depending on the available user's entitlement information item (e.g. valid, semi-valid, invalid).

In addition, according to the application it is provided that a first inspection feature is output during the first transmission phase. Furthermore, a second inspection feature can be output during a second transmission phase following the first transmission phase (preferably directly or indirectly, e.g. after a pause). The second (valid) inspection feature is preferably different from the first (valid) inspection feature due to the different inspection data sets. Thus, a first inspection data set is output for a first inspection data set and a particular user's entitlement information item, and a second inspection feature is output for a second inspection data set and the particular user's entitlement information item, wherein the second inspection feature differs from the first inspection feature.

Furthermore, during the first transmission phase, a first validity feature is output on a second output module of the mobile inspection device. In addition, during the second transmission phase a second validity feature can be output. While the first validity feature based on the first inspection data set, the second validity feature is based on the second inspection data set. The second validity feature can differ from the first validity feature, in particular based on the inspection data sets sent in each case.

This allows the inspector to compare in real time an inspection feature based on a particular inspection data set with a validity feature based on the same inspection data set. The inspection feature is output on at least one mobile user terminal to be inspected; the validity feature is output on the mobile inspection device. On the basis of the comparison, at least one permitted use or non-permitted use can be deduced.

In particular, the inspection method according to the application allows an inspector to easily distinguish validly operated mobile user terminals and mobile user media, respectively, from invalidly operated mobile user terminals. At the same time, the present method allows the inspector to easily distinguish fake inspection features that have been copied and redistributed to a mobile user terminal from authentic inspection features.

In principle, it is possible that each transmission phase has the same (time) length (e.g. x seconds). In this case, a modified inspection data set is automatically sent after this period (e.g. 10 s, 20 s etc.) has elapsed. This ensures that the inspection features output (and the corresponding validity features) change over time during an inspection process.

The duration of a transmission phase can be varied in accordance with a preferred embodiment of the inspection method according to the application. In particular, the duration of a transmission phase can be controlled by a random generator, for instance of the inspection device. For example, the random generator can randomly determine the duration of each transmission phase between a minimum time period and a maximum time period. Due to the unpredictable change of an output inspection feature due to the randomly varying transmission phase lengths, manipulation can be made even more difficult.

Alternatively or additionally, the duration of a transmission phase (and thus e.g. the rate of change of the inspection features) can be controlled in response to a detected actuation of at least one user input module of the mobile inspection device. For example, the mobile inspection device may have at least one user input module and user interface, respectively, that allows an inspector to influence (e.g. lengthen or shorten) the duration of a transmission phase. The user input module may include/be, for example, at least one key, soft key, touch display, speech acquisition unit or the like. This allows an inspector to control the change of inspection features output by the mobile user terminals to be inspected in a specific way during the inspection process. The inspector can therefore "toggle" through different validity features, and the inspection features output by the mobile user terminals to be inspected must follow these changes in order to be recognized as "valid".

According to a further embodiment of the inspection method according to the application, an (valid) inspection feature output by the first output module can be identical (i.e. essentially identical) to the validity feature output by the second output module if a valid user's entitlement information item is available. In this case, for example, the inspection feature output can (essentially) be identical to the validity feature output during the same transmission phase. With a graphical inspection feature, the displayed validity feature can be (essentially) identical to the graphical inspection feature; with a graphical inspection feature, the output module is therefore a display module, such as a screen or LC-display. It shall be understood that due to the use of different display modules (e.g. different shape, size, resolution, etc.), deviations may occur without questioning the essential identity of the displayed features.

However, according to the application, there may also be a similarity between different presentation formats. For example, as an inspection feature, a "red triangle" can be displayed graphically on a first display module. A similarity in accordance with the application with a validity feature is given in particular if a second output module also represents a "red triangle" in graphical form, displays a "red triangle" in text form or outputs a "red triangle" in acoustic form, e.g. via a loudspeaker or headphones.

Alternatively or additionally, an (invalid) inspection feature output by the first output module can deviate from the validity feature output by the second output module in at least one first feature attribute when an invalid user's entitlement information item is available. In particular, it can be specified that when an invalid user's entitlement information item is detected—for example if no validity status (e.g. acknowledgement message) is stored in the mobile user terminal due to a missing logon of the mobile user terminal to the background system—an invalid inspection feature is output that differs from a valid inspection feature in at least one specific first feature attribute. In particular, there is no similarity to a validity feature. A deviation can be perceived immediately by an inspector.

It goes without saying that the deviation can also appear in two or more first feature attributes. Based on the above example, for example, instead of a red triangle, a triangle of a different color and/or an object of a different shape can be displayed as an (invalid) inspection feature. Due to the deviation in at least one specific first feature attribute, it is directly apparent to the inspector that the user of the corresponding mobile user terminal is not authorized to use the service.

In addition, alternatively or additionally, a (semi-valid) inspection feature output by the first output module may differ from the validity feature output by the second output module in at least one second feature attribute for an available semi-valid user's entitlement information item. It has been recognized that, for example, in an occupancy recording system, the problem may arise that a logon to the background system has failed, for example due to a (currently) missing communication network between the mobile user terminal and the background system. However, it may be stored in the mobile user terminal that one or more logon attempts have been made. In this case, a semi-valid state may preferably be stored in the mobile user terminal as a user's entitlement information item. To distinguish this validity status from the statuses described above, a semi-valid inspection feature can be output that differs from a valid inspection feature (and from an invalid inspection feature) in at least one particular second feature attribute (that differs in particular from the first feature attribute). In particular, there is no similarity to the validity feature.

It goes without saying that the deviation can also be shown in two or more second feature attributes. Based on the above example, instead of a red triangle (valid state) or a triangle of another color (invalid state), a red and flashing triangle or an additional object (e.g. text field with "in-detail inspection required") can be displayed as an inspection feature. Due to the deviation in at least one specific second feature attribute, it is directly apparent to the inspector that the user of the corresponding mobile user terminal has a "semi-authorization" to use a service.

In other words, depending on the available user's entitlement information item (e.g. valid, semi-valid, invalid), different first inspection features (e.g. valid, semi-valid, invalid) are output on a mobile user terminal to be inspected and different second inspection features (e.g. valid, semi-valid, invalid) are output on a mobile inspection device. A comparison with the first validity feature and the second validity feature, respectively, makes it easy to check the permission of a user.

According to a preferred embodiment of the application method, an inspection feature may be a graphical inspection feature in the form of a graphical (film) sequence and/or an acoustic inspection feature in the form of an acoustic sequence (sound sequence). A graphical and/or acoustic sequence is/are easily inspectable by an inspector and in particular more difficult to copy compared to a static image, for example. Since in an inspection method it can be expected to find the vast majority of mobile user terminals to be inspected "valid", it may be further preferred to limit the output of acoustic inspection features to those user terminals that are used "invalid" or "semi-valid".

A validity feature can also be a graphical validity feature in the form of a graphical (film) sequence and/or an acoustic validity feature in the form of an acoustic sequence. In particular, a purely graphical image sequence can be displayed on the mobile inspection device as a validity feature. Since the validity feature is the reference feature output by the inspection device, the system prefers to output the validity feature only graphically (not acoustically).

Preferably, the output validity features can be a feature that is of the same kind as the output valid inspection feature, and in particular identical.

As already described, an inspection feature and/or a validity feature may preferably be a graphical sequence and/or an acoustic sequence.

According to an embodiment of the inspection method according to the application, the graphical and/or acoustic sequence may be a video sequence, preferably a video sequence from a variety of video sequences stored in the mobile user terminals to be inspected in a clearly identifiable manner. If a plurality of mobile user terminals with valid user's entitlement information items receive an identical first inspection data set at the same time in an inspection method according to the application, an identical first video sequence can be displayed on these devices as a valid inspection feature. The first inspection data set can identify the first video sequence. If the same mobile user terminals receive a second inspection data set during the same inspection, displaying of the first video sequence can be stopped and displaying of a second video sequence can be started on each of the mobile user terminals. The second inspection data set can identify the second video sequence. This process is controlled in particular by a service usage application installed on the mobile user terminals.

According to a further embodiment of the inspection method according to the application, the graphical and/or acoustic sequence may be formed from a plurality of feature attributes. In particular, a service usage application of mobile user terminals can determine the graphical and/or acoustic sequence from the majority of feature attributes. The advantage of this version is that in particular less storage space is required on the mobile user terminals than for storing finished video sequences. The service usage application can determine the graphical and/or acoustic sequence in real time from feature attributes contained in the inspection data set which can be processed from stored graphical and/or acoustic elements, comparable to a vector graphic.

The plurality of feature attributes can be classified in a plurality of classes. In particular, the plurality of classes may comprise at least two of the following classes:
Shape of at least one object to be displayed,
Size of at least one object to display,
Color of at least one object to display,
Movement pattern of at least one object to be displayed,
Speed of movement of at least one object to be displayed,
Background color,
Text field,
Tone or tone sequence.

Table 1 below shows exemplary and, in particular, non-exhaustive feature attributes that are classified in exemplary and non-exhaustive different classes.

TABLE 1

| class | feature attribute |
| --- | --- |
| Shape | Line, triangle, square, circle etc. |
| Size | large, medium, small etc. |
| Color | red, green, blue, yellow, white, black etc. |
| Movement patterns | from the left display edge to the right display edge, from the right display edge to the left display edge, from the upper display edge to the lower display edge, from the upper left display corner to the lower right display corner, etc. |
| Speed of movement | fast, slow etc. |
| Background color | red, green, blue, yellow, white, black etc. |
| Text field | "inspection", current date, current time, a specific character string (e.g. "1, 2, 3") etc. |
| Sound | no sound, ringtone#1, ringtone#2 etc. |

For example, a graphical and/or acoustic sequence may be composed of two or more attributes (of different classes). For example, a small red triangle that moves from the left edge of the display to the right edge of the display can be displayed as a sequence. In this example, the sequence is formed from the following feature attributes:
Color: red
Shape: triangle
Size: small Movement patterns: from the left display edge to the right display edge It goes without saying that the sequence can include further feature attributes, such as another object with another shape, a specific background color, and so on.

As described above, an inspection feature (and a validity feature) displayed during a particular transmission phase is based in particular on the inspection data set sent by the inspection device during that particular transmission phase. In an embodiment, a sent inspection data set may identify a video sequence to be output stored in the mobile user terminal; in an embodiment, a sent inspection data set may contain the respective feature attributes of a graphical or acoustic sequence to be output which the service usage application compiles and displays from the feature attributes in real time.

An inspection data set may comprise a plurality of inspection instructions in accordance with a particularly preferred embodiment of the inspection method according to the application. In the mobile user terminal a plurality of (previously described) feature attributes can be stored. Preferably, an inspection instruction can be assigned (unambiguously) to each stored feature attribute. The graphical sequence and/or acoustic sequence can be generated based on the inspection instructions of a received inspection data set and can be output by a first output module. In particular, an inspection instruction may be a specific code, preferably a number (for example, a hexadecimal number).

All feature attributes from which an inspection feature can be formed can be stored in every (registered) mobile user terminal. The same may apply to the mobile inspection device. Exactly one inspection instruction can be assigned to each stored feature attribute in a unique way. For example, at least one corresponding assignment table (e.g. a lookup table or conversion table) can be stored in the mobile user terminal. An assignment table (see Table 2) is shown below as an example.

TABLE 2

| inspection instruction | feature attribute |
| --- | --- |
| 0001 | triangle |
| 0010 | rectangle |
| 0011 | red (color of the object) |
| 0100 | from the left display edge to the right display edge |
| 0101 | swift |
| 0110 | red (background color) |
| 0111 | "inspection" (text field) |
| 1000 | no sound |
| etc. | etc. |

In particular, a data set with two or more inspection instructions (e.g. {0001, 0011, 0111}), i.e. an N tuple, can be sent out as an inspection data set. The mobile user terminal (and the mobile inspection device) or the service usage application installed on the mobile user terminal can form and generate, respectively, a graphical and/or acoustic sequence, in particular in real time, on receipt of a corresponding inspection data set by means of the inspection instructions contained therein and, for example, the stored assignment table (and the stored objects).

The sequence formed in this way can be output by the first output module until, for example, another inspection data set with at least one other inspection instruction is received in a subsequent transmission phase. The sending of inspection instructions has the advantage over the sending of feature attributes that the amount of data to be sent can be significantly reduced. This, in turn, can result in (almost) no delay between the start of a sending of an inspection data set and an output of the corresponding inspection feature. In other words, after an inspection data set has been sent, an inspection feature can be output immediately and, in particular (almost) in real time.

Preferably, the feature attributes and (uniquely) assigned inspection instructions can be stored on the mobile user terminal during a registration process. During the registration process on a background system (as described above), for example, this data can be uploaded from the background system to the mobile user terminal.

Alternatively or additionally, the feature attributes and the (uniquely) assigned inspection instructions can be stored on the mobile user terminal during the installation of a service usage application. It may also be provided that the feature attributes are downloaded and stored on the mobile user terminal during registration with the background system for a particular service.

In order to further prevent fraud, it is proposed, in accordance with a further embodiment, that the stored feature attributes and the (uniquely) assigned inspection instructions are updated at specific times, in particular regularly (e.g. once a month or once a week, etc.), during a background system update process of a service usage application on the mobile user terminal. In particular, changed feature attributes, changed inspection instructions and/or changed assignments can be saved during an update. It may be provided that without such an update, permitted use of a service is no longer possible.

Preferably, the storing of feature attributes and the (uniquely) assigned inspection instructions may include the downloading of one or more assignment table(s).

In the embodiment described above, where the graphical and/or acoustic sequence is a video sequence from a plurality of video sequences stored in a uniquely identifiable manner in the mobile user terminals to be inspected, the video sequences may be stored on the mobile user terminal during the registration process. During the registration process on a background system (as described above), for example, this data can be downloaded from the background system to the mobile user terminal. It may also be provided that the video sequences are downloaded and stored on the mobile user terminal during registration with the background system for a specific service.

In a further embodiment, it may be provided that the stored video sequences are updated on the mobile user terminal at specific times, in particular regularly (e.g. once a month or once a week etc.), during an update process of a service usage application to be carried out with a background system. In the case of an update, in particular changed video sequences and/or changed assignments can be stored. Here, too, it may be provided that without the implementation of such an update, a permitted use of a service is no longer possible.

According to another embodiment of the inspection method, the assignment of an inspection instruction to a feature attribute can depend on a validity status of the user's entitlement information item. For example, at least two, preferably three, assignment tables described above may be provided. A first assignment table can be applied for an available valid user's entitlement information item, a second assignment table for an available invalid user's entitlement information item, and a third assignment table for an available semi-valid user's entitlement information item. In each of the assignment tables, a unique assignment between the at least one inspection instruction and the at least one feature attribute can be stored. Based on the available user's entitlement information item, the corresponding assignment table can be determined, e.g. by the service usage application, and depending on this assignment table and the inspection instructions received, the inspection feature can be generated in the form of a sequence described above. In a simple way, different sequences are output by a first output module depending on the available user's entitlement information item.

The inspection instructions contained in each inspection data set may be specified in advance. According to a preferred embodiment, the inspection instructions contained in each inspection data set may be controlled by a random generator arranged in the mobile inspection device and/or in response to a detected actuation of at least one user input module of the mobile inspection device. For example, a random number generator can determine the respective inspection data sets or their inspection instructions within predefined framework conditions (for example, predefined classes, minimum and maximum number of feature attributes).

The inspection instructions contained in the respective inspection data sets can also be influenced at least in part by the use of a (previously described) user input module. For example, this can be used to influence at least one class of feature attributes (such as speed of movement or text field) in an inspection data set. It goes without saying that a change in a feature attribute by an inspector can simultaneously control a change in the transmission phase lengths. For example, if the inspector changes the speed of movement as a feature attribute via the user input module, a corresponding inspection data set can be generated and sent immediately (or after a specific period of time). The immediate transmission in this case also includes the control of the length of the previous transmission phase.

By providing a possibility for the inspector to influence in (almost) real time the (valid) inspection features (and validity features) to be output by the method, the protection against fraud can be further improved. A copied inspection feature can be easily detected.

In order to prevent a user from logon at a background system or purchasing a valid electronic ticket during an inspection process, respective actions may be disabled or blocked, preferably at the beginning of an inspection process, in accordance with an embodiment of the inspection method. In particular, during an inspection start phase, before the first transmission phase, a control data set may be sent which is configured to be received by the mobile terminals located in the area liable to pay. If the mobile user terminal receives the control data set, the mobile user terminal (or service usage application) can be set to an inspection mode, for example during the entire inspection period.

Preferably, the sending of the control data set can be caused at least by the mobile inspection device. For example, the mobile inspection device can sent the control data set or cause the sending by another transmitter. The at least one other transmitter may be, for example, at least one detection unit arranged in a transport device which is used, for example, in a normal operating mode for exchanging presence messages. The control data set sent includes, in particular, instructions causing the mobile user terminal, in particular the service usage application, to be set to the inspection mode. The user terminal may remain in this inspection mode for at least as long as the control data set is received. The sending of the control data set can be repeated periodically so that the mobile user terminals remain in the inspection mode as long as new control data sets are received within specific time intervals.

In this inspection mode, at least registration or purchase of a ticket or validation of a ticket may be blocked. For example, in the inspection mode at least change to the user's entitlement information item available in the mobile user terminal can be blocked. In particular, this also includes the fact that a user's entitlement information item in the form of an electronic ticket can no longer be validated, and the registration of the mobile user terminal with the background system can also be disabled or blocked.

The detection unit, which is mainly used in normal operating mode for exchanging presence messages, may be arranged to establish a transmission field by means of at least one antenna in the area liable to pay, which can be received by all mobile user terminals present. The detection unit may also be able to receive presence messages from mobile user terminals by means of the at least one antenna. Wireless data exchange between the detection unit and mobile user terminals can be based on the Bluetooth, Bluetooth Low Energy (BLE) or WLAN standard; in particular, so-called BLE beacons and their antennas and protocols can be used.

In particular after completion of the inspection process, the mobile user terminal and the service usage application, respectively, can be reset to the normal operating mode. For example, this can be done by sending a corresponding data set or by ending the (periodic) sending of the control data set. Sending of a corresponding data set to cancel the inspection mode or termination of the transmission of the control data set may be caused by the mobile inspection device and/or automatically at the next stopping station or upon detection of an opening of a vehicle door. In addition, a specific period of time can be specified for a block, after which the mobile user terminal, in particular the service usage application, can be automatically reset to the normal operating mode.

The above described embodiments can be used in particular for an occupancy recording system described above. In the case of an occupancy recording system, it is particularly important that the mobile user terminal (or the user operating the mobile user terminal) permits that the presence of the mobile user terminal in the area liable to pay (e.g. transport device, event area, etc.) is actually detected and recorded from the beginning to the end of the use of the service, i.e. from an entry into the room to an exit out of the room, in order to allow authorized use of an occupancy recording system. This can be achieved, for example, by using the BIBO process, the CIBO process or the CICO process.

Preferably, the mobile user terminal or the service usage application installed on it can logon to the background system with one of the above methods at the beginning of the use of the service. In the registration process, registration data can be sent to the background system that is suitable for the background system to assign the registration to a previously registered user (or the user account of the user) of the service usage application. In other words, it can be ensured that the mobile user terminal used with an installed service usage application can be assigned to exactly one user.

During the registration process, a data entry can be stored in the mobile user terminal, in particular the service usage application, as a user's entitlement information item, which contains in particular a time stamp (date and time of registration).

If the logon is successful, i.e. if the logon data is actually received by the background system and checked as authentic, the background system can send an acknowledgement message to the successfully logged on mobile user terminal. The content of the receipt message can be stored as a (valid) user's entitlement information item in the mobile user terminal, in particular the service usage application. In particular, the acknowledgement message also contains a time stamp and a confirmation of a successful registration.

With a ticket-based system, an electronic ticket for the service used can be available in the mobile user terminal as a user's entitlement information item. In order to inspect whether the stored electronic ticket is a valid ticket, i.e. whether a valid user's entitlement information item is available, the mobile inspection device can send out at least one reference ticket data set together with an inspection data set in accordance with a further embodiment of the inspection method in accordance with the application. A common sending of ticket and inspection data set also includes that the ticket data can be contained in the inspection data set (or vice versa).

The outputting, by the first output module, of an inspection feature may also be based on the received reference ticket data set. In particular, a reference ticket data set contains valid ticket data that defines which electronic tickets stored on the mobile user terminals are actually valid for the service inspected in the inspection process. Only if at least one electronic ticket corresponding to the valid ticket data is stored in the mobile user terminal, in particular the service usage application, the available user's entitlement information item can be evaluated as a valid user's entitlement information item. In the manner described above, a corresponding valid inspection feature can be output.

In ticket-based systems that expect the electronic ticket to be validated at the start of the service, an electronic ticket may also be marked as validated in the mobile user terminal (if validated) so that the available user's entitlement information item can be evaluated as a valid user's entitlement information item. A ticket that has not been validated may therefore be an invalid user's entitlement information item. Accordingly, no valid inspection feature is output in the manner described above; in particular, an invalid inspection feature can be output instead.

Another aspect of the application is a system, in particular a transport system. The system comprises at least one mobile inspection device and at least one mobile user terminal to be inspected. The mobile inspection device is configured to send at least one first inspection data set during a first transmission phase. At least one communication module of the mobile user terminal is configured to receive the at least one first inspection data set. At least one first output module of the mobile user terminal is configured to output at least one first inspection feature during the first transmission phase based on the received first inspection data set and at least one user's entitlement information item available in the mobile user terminal. At least one second output module of the mobile inspection device is configured to output at least one first validity feature corresponding to the first inspection data set during the first transmission phase.

In particular, the system may be operated using the inspection method described above.

Another aspect of the application is a mobile inspection device. The mobile inspection device comprises at least one communication module configured to send at least one first inspection data set during a first transmission phase, wherein the first inspection data set is configured to cause outputting, by at least one first output module of the mobile user terminal, at least one first inspection feature during the first transmission phase based on the received first inspection data set, and at least one user's entitlement information item available in the mobile user terminal. Further, the mobile inspection device comprises at least one second output module configured to output at least one first validity feature corresponding to the first inspection data set during the first transmission phase.

In particular, the communication module may include a near-field communication interface compatible with a near-field communication interface of at least one mobile user terminal to be inspected. Preferably, the near-field communication interface can be a Bluetooth interface. As an alternative or in addition to a Bluetooth interface, an infrared interface, WLAN (Wireless Local Area Network) interface etc. can also be provided as a near-field communication interface.

The mobile inspection device may, in particular be used in a system described above to inspect preferably a plurality of mobile user terminals.

Another aspect of the application is a method for operating a mobile inspection device, in particular a mobile inspection device described above. The method includes:
  Sending, by the mobile inspection device, at least one first inspection data set during a first transmission phase, wherein the first inspection data set is configured to cause outputting, by at least one first output module of the mobile user terminal, at least one first inspection feature during the first transmission phase based on the received first inspection data set and at least one user's entitlement information item available in the mobile user terminal,
  outputting, by a second output module of the mobile inspection device, at least one first validity feature corresponding to the first inspection data set during the first transmission phase.

Another aspect of the application is a service usage application, in particular an occupancy recording application, for installation on a mobile user terminal. The service usage application includes at least one reception module arranged to receive at least one first inspection data set sent by a mobile inspection device during a first transmission phase. The service usage application comprises at least one processing module configured to cause outputting, by at least one first output module of the mobile user terminal, at least one first inspection feature during the first transmission phase based on the received first inspection data set, and at least one user's entitlement information item available in the mobile user terminal.

In particular, the service usage application can be a software application that can be installed on a mobile user terminal as an app. The software application may comprise in particular executable code as modules.

Another aspect of the application is a mobile user terminal on which the service usage application described above is installed.

A module or unit may be at least partly software and/or at least partly hardware. In particular, a device/element may include appropriate computing elements (e.g. processor, memory, etc.).

The characteristics of the processes, systems, devices and applications can be freely combined with each other. In particular, features of the description and/or of the dependent claims, even with complete or partial circumvention of features of the independent claims, may be independently inventive in their own right or freely combined with each other.

There are now a plurality of possibilities to design and further develop the inspection method according to the application, the system according to the application, the mobile inspection device according to the application, the method for operating a mobile inspection device according to the application and the service usage application according to the application. In this regard, reference is made on the one hand to the claims subordinate to the independent claims and on the other hand to the description of embodiments in connection with the figures.

DETAILED DESCRIPTION OF SPECIFIC EMBODIMENTS

In the following, the same reference signs are used for the same elements.

Figure 1:
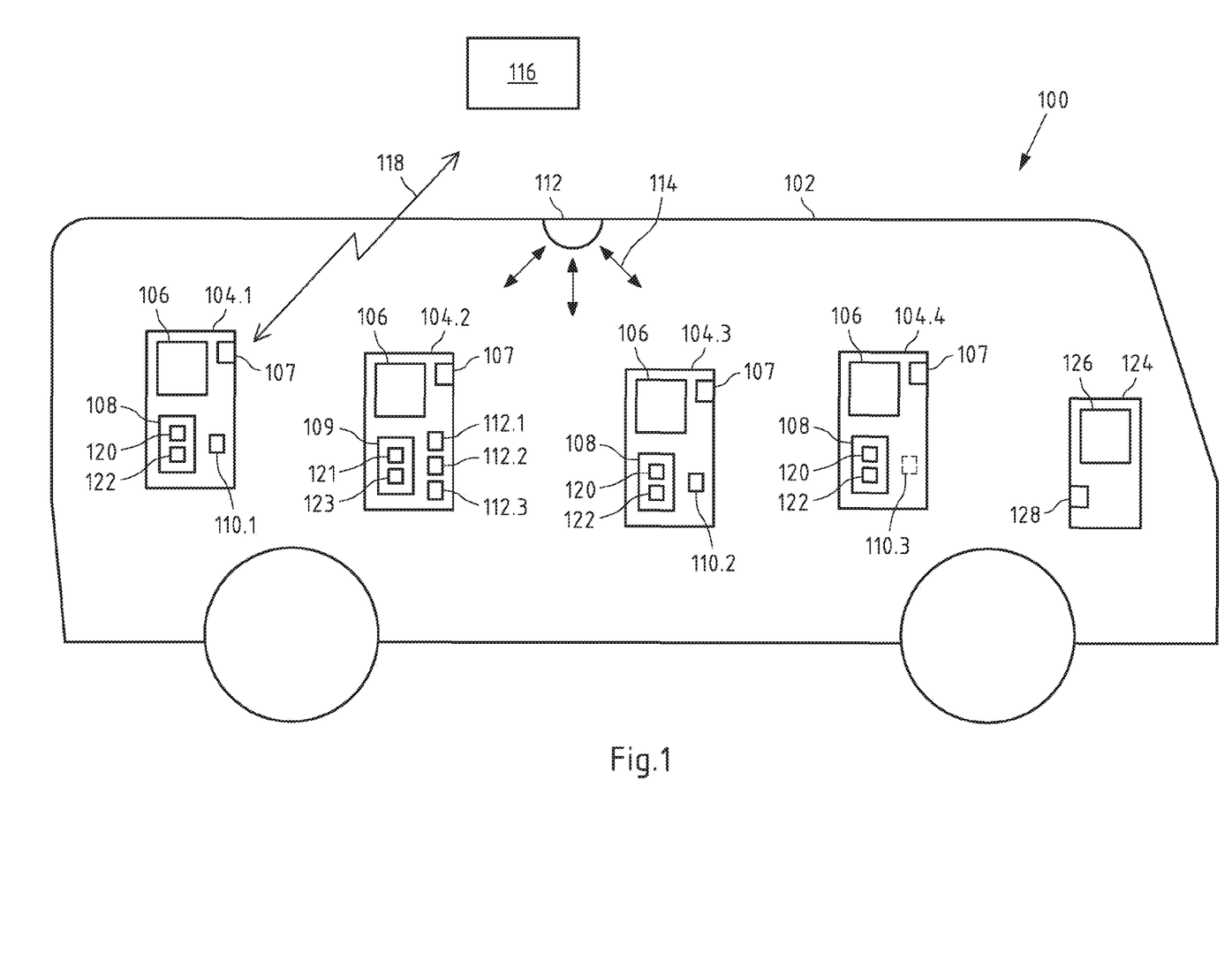
FIG. 1 is a schematic view of an embodiment of a system, in particular a transport system, in accordance with the present application.

FIG. 1 shows a schematic view of an embodiment of a system 100 according to the present application. The system 100 shown in the present example is a transport system 100 in which a transport service can be used by users. The following explanations can be easily transferred to other systems where users make use of other services, such as participation in an event (e.g. concert, theatre, sports event, etc.).

In this example, the system 100 comprises a transport device 102. As an example, the transport device 102 is a bus 102 that can be used by users. It goes without saying that other transport devices can be used in other variants of the application.

In order to use the transport service, each user can use his mobile user terminal 104.1 to 104.4. The shown system 100 can in particular be a hybrid system 100. A hybrid system 100 combines an occupancy recording system and a ticket-based system. It goes without saying that in other variants the system can only be an occupancy recording system or a ticket-based system.

FIG. 1 schematically shows a plurality of mobile user terminals 104.1 to 104.4. Each mobile user terminal 104.1 to 104.4 can have at least one first output module 106, presently in the form of a graphical display 106 (e.g. a touch display). In addition, a mobile user terminal 104.1 to 104.4 can have at least one (not shown) acoustic output module (e.g. a loudspeaker). In addition, each mobile user terminal 104.1 to 104.4 may preferably have at least one communication module 107, in particular a plurality of communication modules 107 for the use of a plurality of (wireless) communication technologies. Exemplary and non-exhaustive near-field communication technologies are Bluetooth, infrared and WLAN, and exemplary and non-exhaustive remote communication technologies are GSM (Global System for Mobile Communications), UMTS (Universal Mobile Telecommunications System) and LTE (Long Term Evolution). In another embodiment, it may be provided that the mobile user terminals 104.1 to 104.4 do not have a remote communication interface, but only near-field communication interfaces. This may be the case in particular if the mobile user terminals are dedicated ticketing devices.

A mobile user terminal 104.1 to 104.4 can be a smart-phone, tablet computer, mobile game console, laptop, netbook, data glasses or Smart Watch, for example, which can be carried by a user during the use of the transport service. Alternatively, a mobile user terminal may be a dedicated ticketing device designed exclusively for a ticketing application.

In order to be able to make permitted use of the transport service, at least one service usage application 108, 109, for example a ticket application 109 and/or an occupancy recording application 108, must be installed on each mobile user terminal 104.1 to 104.4. A service usage application 108, 109 comprises a receiving module 120, 121 and a processing module 122, 123. In particular, the service usage application may include computer code that can be executed by the mobile user terminal 104.1 to 104.2.

In addition, a schematically shown a user's entitlement information item 110.1 to 110.3, 112.1 to 112.3 is available in each of the mobile user terminals 104.1 to 104.2.

FIG. 1 also shows a mobile inspection device 124 of an inspector. The mobile inspection device 124 comprises at least one second output module 126 and at least one communication module 128. The second output module 126 may in particular be a graphical display 126. Alternatively or additionally at least one (not shown) acoustic output module (e.g. a loudspeaker) can be provided. In particular, the communication module 128 may comprise a wireless near-field communication interface, such as a Bluetooth interface. In particular, the communication module 128 may comprise a near-field communication interface compatible with at least one of the near-field communication interfaces available in the communication modules 107 of the mobile user terminals. A mobile inspection device 124 can be a smart-phone, tablet computer, mobile game console, laptop, netbook, data glasses or Smart Watch.

As further shown in FIG. 1, the transport device 102 has at least one detection unit 112, in particular in the form of a near-field transmitting/receiving unit 112, configured to exchange messages with the mobile user terminals 104.1 to 104.4 located within the transport device 102 via a near-field communication data network 114 (e.g. Bluetooth, WLAN etc.).

In addition, the system 100 may comprise at least one background system 116 remote from the transport device 102, e.g. in the form of one or more server(s) 116. It can at least be provided that the mobile user terminals 104.1 to 104.4 can communicate with the background system 116 via a remote communication data network 118 (e.g. mobile radio in the form of GSM, LTE etc.). In another not shown embodiment, the mobile user terminals 104.1 to 104.4 may have no remote communication interface, but only near-field communication interfaces. In this case, communication between the mobile user terminals 104.1 to 104.4 and the background system 116 can take place via the detection unit 112.

The first mobile user terminal 104.1 has a valid user's entitlement information item 110.1 as a user's entitlement information item 110.1. In particular, a corresponding validity status may be stored as a user's entitlement information item 110.1 in the first mobile user terminal 104.1. Preferably, after successful logon of the mobile user terminal 104.1 to the background system 116 (e.g. according to the aforementioned methods BIBO, CIBO or CICO), a valid user's entitlement information item 110.1 may be available on the mobile user terminal 104.1 by storing a corresponding information in a memory module of the user terminal 104.1. For example, an acknowledgement message sent by the background system 116 after successful authentication of the mobile user terminal 104.1 may be stored as a valid user's entitlement information item 110.1. This can be updated during use of the service based on the presence messages exchanged with the detection unit 112, for example, by the room detection application 108.

On the second mobile user terminal 104.2, shown as an example, a plurality of electronic tickets 112.1 to 112.3 are available as user's entitlement information items 112.1 to 112.3. It is assumed below that at least one of the stored electronic tickets 112.1 to 112.3 entitles for the use of a current transport service.

The third mobile user terminal 104.3 has a semi-valid user's entitlement information item 110.2. For example, a corresponding state can be stored in a (not shown) memory module of the mobile user terminal 104.3 if the room detection application 108 has initiated the logon process to the background system (and, for example, has regularly reattempted to do so), but has not received an acknowledgement message as described above. The reason for this may be, for example, that no communication connection can be established with the background system 116.

An invalid user's entitlement information item 110.3 is available as a user's entitlement information item 110.3 on the fourth exemplified shown mobile user terminal 104.4. This can be given, for example, by the fact that no acknowledgment message and, in particular no attempts to logon to the background system are stored, or only an acknowledgment message from a previous use of a transport service.

Figure 3:
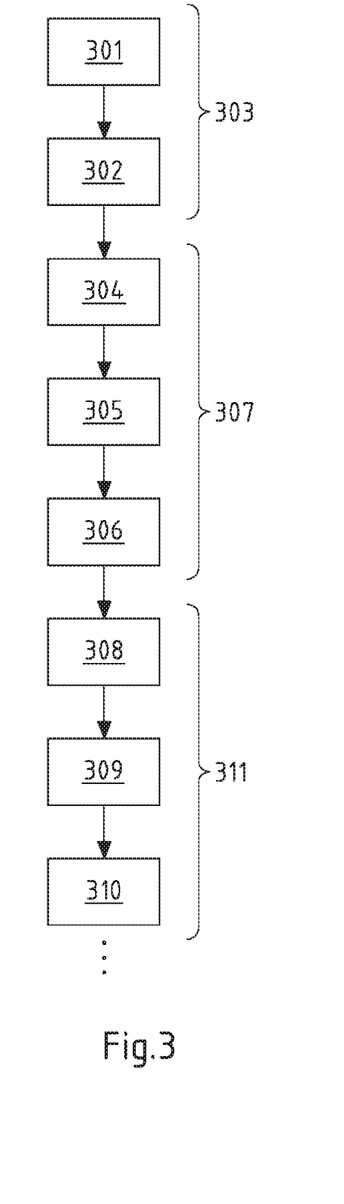
FIG. 3 is a diagram of an embodiment of an inspection method in accordance with the present application.

An inspection process is described below using FIGS. 1 and 3 as examples. FIG. 3 shows a diagram of an embodiment of an inspection method according to the present application to inspect a user's entitlement to use a transport service.

In a first step 301, during an inspection start phase 303, a control data set can be sent which is configured to be received by the mobile terminals located within the area liable to pay. Preferably, the sending of the control data sets can be initiated at least by the mobile inspection device 124. For example, a communication link can be established between the mobile inspection device 124 and the detection unit 112. By transmitting a corresponding command instruction over the communication link to the detection unit 112, the detection unit 112 can be instructed to send the control data set over the near-field communication network 114.

The mobile inspection device 124 can also configured to send the control data set. For example, at least one communication module 128 of the mobile inspection device 124 can be used for transmission.

The sending of the control data set can take place permanently (periodically) during the entire inspection process. It shall be understood that in other variants of the application, different control data sets can also be sent out in order to set the mobile user terminals into the inspection mode at the beginning of the inspection process and into the normal operating mode at the end of the inspection process.

Preferably, the control data set can be sent according to the BLE (Bluetooth Low Energy) standard. Data sent according to the BLE standard can be received by almost any mobile user terminal 104.1 to 104.4, in particular with a standard operating system (e.g. Apple iOS, Google Android, Microsoft Windows Mobile, Microsoft Mobile Phone, Blackberry OS, Symbian OS, Firefox OS, Tizen, Aliyun OS).

In step 302, the user terminals 104.1 to 104.4 receive each at least one control data set.

The control data set may include at least one instruction causing the receiving mobile user terminal 104.1 to 104.4, in particular the service usage application 108, 109 installed on the mobile user terminal 104.1 to 104.4, to be set to an inspection mode. In other words, if the control data set is received by a mobile user terminal 104.1 to 104.4, the mobile user terminal 104.1 to 104.4 may be set to an inspection mode during an inspection period.

For a mobile user terminal 104.1 to 104.4 in inspection mode, at least logging into the background system and/or purchasing an electronic ticket and/or validating an electronic ticket may be blocked. In particular, a change to the user's entitlement information item available in the mobile user terminal 104.1 to 104.4 may be blocked. This can prevent a user from logging in during the inspection process, purchasing a ticket and/or validating a ticket.

During a first transmission phase 307 following the inspection start phase 303, at least one first inspection data set is sent in a step 304 by the mobile inspection device 124, in particular by the communication module 128. The first inspection data set is configured to be received by the mobile user terminals within the range of the inspection field and signal, respectively, emitted by the mobile inspection device. For example, the mobile user terminals 104.1 to 104.4 to be inspected each receive at least one first inspection data set.

An inspection data set comprises data which (after being processed by the mobile user terminal) cause a first inspection feature to be output, in particular displayed, by at least one first output module 106 of the mobile user terminal 104.1 to 104.4 during the first transmission phase 307 in a step 305. In particular, an inspection data set received by a mobile user terminal 104.1 to 104.4 can be provided to a processing module 122, 123 of the installed service usage application 108, 109 for further processing via the receiving module 120, 121. According to a preferred embodiment, the processing module 122, 123 can process an inspection data set as follows:

First, the processing module 122, 123 can check which type of a user's entitlement information item (valid, semi-valid or invalid) is available in the mobile user terminal 104.1 to 104.4. For each state, a separate assignment table may be stored in the mobile user terminal 104.1 to 104.4 in which stored feature attributes are uniquely assigned each to inspection instructions (cf. Table 2).

The inspection instructions extracted from a received inspection data set are applied on the assignment table determined by the available user's entitlement information item (valid, semi-valid or invalid). In particular, based on the assignments, the feature attributes are determined from which the associated inspection feature is generated in the form of a graphical and/or acoustic sequence. Then the processing module 122, 123 causes the inspection feature to be output, in particular the generated graphical sequence to be displayed by the first display 106 and/or the generated acoustic sequence to be reproduced by a loudspeaker (not shown here).

In particular, the processing described above can take place in real time, so that the first inspection feature is displayed immediately after the start of the first transmission phase 307.

During the first transmission phase 307 in step 306, at least one first validity feature corresponding to the first inspection data set is output by at least one second output module 126 of the mobile inspection device, i.e. the data content of the inspection data set in particular uniquely defines the output validity feature. This allows an inspector to easily check a permission of the user by comparing the validity feature output on the mobile inspection device 124 and the inspection feature output simultaneously on the at least one mobile user terminal 104.1 to 104.4 to be inspected. An assignment table can also be stored in the mobile inspection device 124, which allows the generation of the validity feature depending on the inspection instructions currently sent.

A more detailed description of the inspection by an inspector is given below in conjunction with a description of the FIGS. 2a to 2c.

The first inspection feature and the first validity feature are output until the end of the first transmission phase 307. The duration of the first transmission phase 307 essentially corresponds to the duration during which the first inspection data set is sent by the mobile inspection device 124. In general, a transmission phase ends and a new transmission phase begins when the inspection data set, in particular at least one inspection instruction, changes. It goes without saying that a transmission phase can also end when no further inspection data set is sent and the inspection method is terminated or interrupted.

In this case, the first transmission phase 307 is followed by a second transmission phase 311. During the second transmission phase 311, the mobile inspection device 124 sends a second inspection data set different from the first inspection data set in at least one inspection instruction. For example, as described for step 305, a second inspection feature can be output on the mobile user terminals 104.1 to 104.4 in step 309. In addition, in step 310, a second validity feature can be output, for example, as described in step 306.

By sending at least two different inspection data sets during an inspection process, which cause two different valid inspection features and two different validity features to be output, a copied and forwarded inspection feature can be detected.

The duration of the transmission phases 307, 311 can be the same. The duration of the transmission phase 307, 311 can also be varied, for example by a random generator or by the inspector, by the mobile inspection device having at least one operable user input module.

Furthermore, the different inspection data sets can be sent in a pre-defined order. The sequence of the different inspection data sets can also be influenced by a random generator or by the inspector, by the mobile inspection device having a corresponding user input module. This is also explained in more detail in connection with FIGS. 2a to 2c.

As indicated in FIG. 3, further transmission phases can be connected to the second transmission phase 311.

In a ticket-based method, in steps 304 and 308, the mobile inspection device 124 can send at least one reference ticket data set together with the respective inspection data set. For example, the inspection data set may include ticket data.

The output, by the first output module 106, of an inspection feature in steps 305 and 309 may also be based on the received reference ticket data set. In particular, the ticket data received from the processing module 123 can be compared with the ticket data of at least one stored electronic ticket.

In particular, the sent reference ticket data set may contain specifications (e.g. tariff information, etc.) which of the electronic tickets stored on the mobile user terminals 104.2 are valid for the monitored service. If a validation of the electronic ticket is required, this information may also be included in the reference ticket data set. In other words, the sent reference ticket data sets contains specification about what type of electronic ticket must be stored on the mobile user terminals 104.2 for the transport service to be validly used.

For a positive result (valid electronic ticket), a first assignment table may be stored in the mobile user terminal 104.2 and for a negative result (no valid electronic ticket), a second assignment table may be stored in the mobile user terminal 104.2, in which stored feature attributes are assigned to inspection instructions. The inspection instructions extracted from a received inspection data set are applied to the assignment table determined based on the comparison of the ticket data. In particular, the feature attributes from which the assigned inspection feature is generated in the form of a graphical and/or acoustic sequence are determined based on the assignments. Then the processing module 123 causes the inspection feature to be output, in particular the generated graphical sequence to be displayed by the first display 106 and/or the generated acoustic sequence to be reproduced by a loudspeaker (not shown here).

The inspection method can be terminated if, for example, the (periodic) transmission of the control signal or the control data set fails to take place. In this case, the mobile user terminals 104.1 to 104.4 no longer receive a control data set, so that they are set to the normal operating mode. For example, in this mode they can again exchange presence messages with the detection unit 112.

In the absence of a detection unit, the mobile inspection device 124 of the inspection may preferentially send a high-power control signal and cause the mobile user terminals 104.1 to 104.4 to enter the inspection mode for a configurable inspection period, i.e. in particular not to allow validation operations. The mobile user terminals 104.1 to 104.4 can terminate the inspection mode automatically after the inspection period has elapsed, or the mobile inspection device 124 can send an appropriate signal to terminate the inspection mode, as previously specified.

It goes without saying that in the case of other variants of the methods according to the application only one inspection data set can be sent. For example, an inspection device (or the detection unit of the area liable to pay) sends at least one first inspection data set to cause output of correspondingly variable (valid) inspection features by the at least one mobile user terminal to be inspected. For example, receiving a first inspection data set by the mobile user terminals that are validly in use can trigger the (periodic) playback of a first graphical sequence as the first inspection feature. In particular, the first graphical sequence can be designed in such a way that no image sequences are repeated for the expected duration of an inspection process (e.g. up to 10 minutes).

Figure 2A:
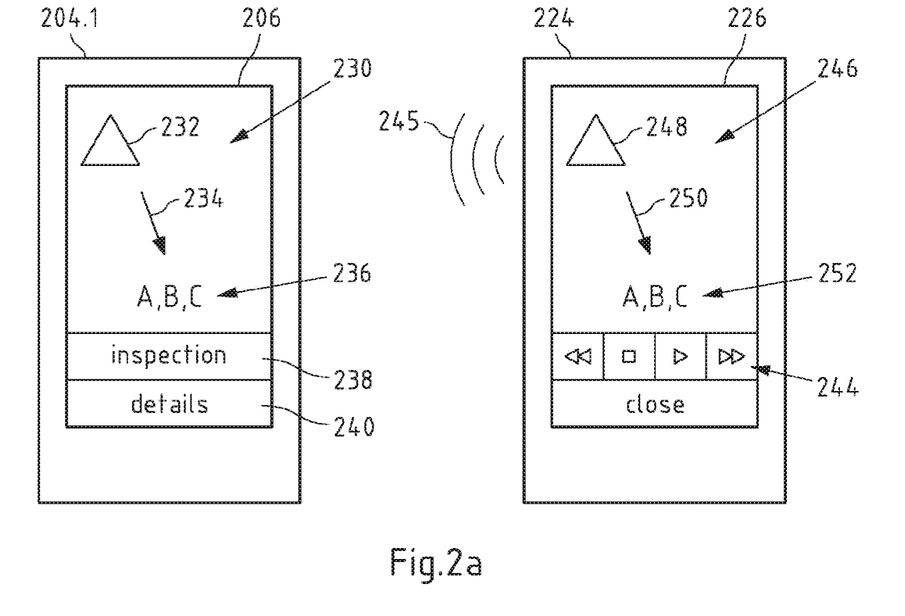
FIG. 2A is a schematic view of a mobile user terminal and a mobile inspection device with a valid user's entitlement information item available on the mobile user terminal.
Figure 2B:
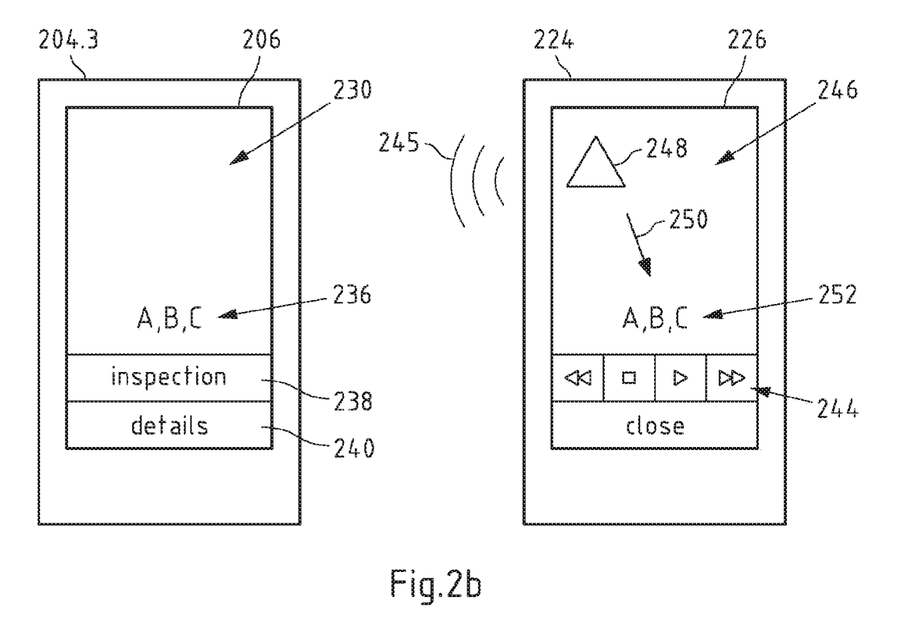
FIG. 2*b* is a schematic view of a mobile user terminal and a mobile inspection device with a semi-valid user's entitlement information item available on the mobile user terminal.
Figure 2C:
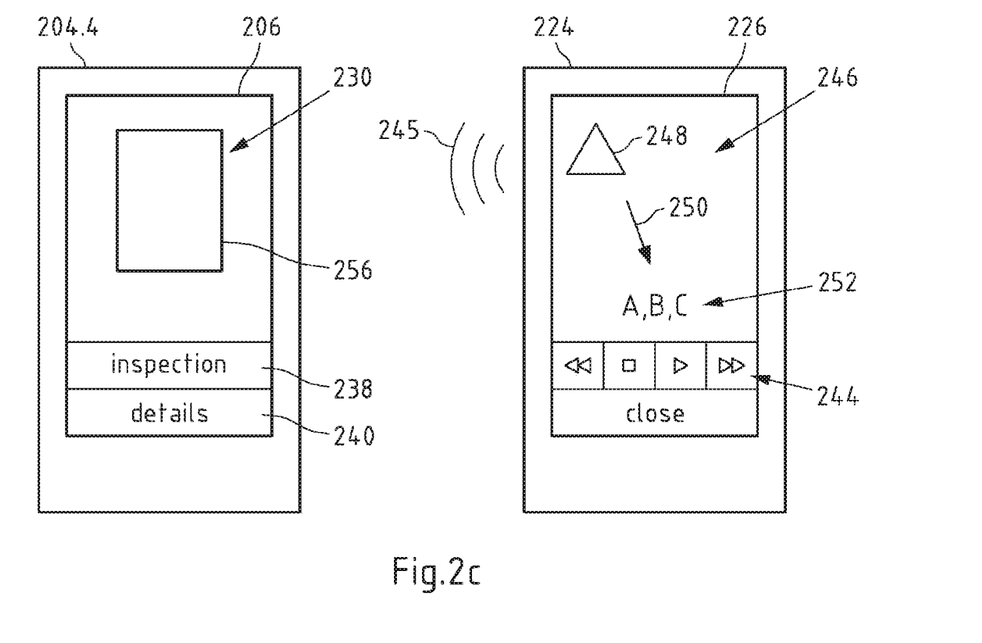
FIG. 2*c* is a schematic view of a mobile user terminal and a mobile inspection device for an invalid user's entitlement information item available on the mobile user terminal.

FIGS. 2a to 2c show schematic views of mobile user terminals 204.1 to 204.4, depending on the available user's entitlement information item, and of one mobile inspection device 224 each during an embodiment of a previously described inspection method.

FIG. 2a shows an embodiment in which a mobile user terminal 204.1 that holds a valid user's entitlement information item is inspected. For example, an acknowledgement message or a valid electronic ticket may be stored. The mobile user terminal 204.1 comprises a first display 206. For example, the user terminal 204.1 may have a touch display 206.

In a first display area at least one inspection feature 230 can be displayed and in a further display area as text field 238 the term "inspection" can be displayed. Optionally, a user input key 240 "details" can be shown in a further display area by the touch display 206. The user input key 240 can be pressed to display further details about the service used, as explained in more detail in FIG. 4.

In addition to the mobile user terminal 204.1, a mobile inspection device 224 is shown. The mobile inspection device 224 comprises a second display 226. For example, the mobile inspection device 224 can be equipped with a touch display 226. A validity feature 246 can be displayed in a first display area of the touch display 226. Another display area of the touch display 226 can provide a user input module 244, for example with a plurality of input keys, arranged to influence the output inspection data sets and/or the lengths of the transmission phases. It goes without saying that other user input modules, such as voice input modules, can be provided in other variants of the application.

During an inspection process, the mobile inspection device 224 emits an inspection signal 245 or an inspection field 245. For example, a Bluetooth signal 245, in particular a BLE signal 245, can be emitted. The inspection signal is the carrier of the respective sent inspection data sets.

The inspection data sets are in particular authentic. This means that it is ensured that a potential fraudster cannot record an inspection signal, extract inspection data from it and thus carry out "inspections" on his own account. For this purpose, the inspection data sets may preferably have a time stamp or be salted (i.e. for the purpose of encryption and/or authentication they may have randomly selected characters or character strings scattered at particular positions in the sequence of the actual use data). Alternatively, authentications based on digital signatures or digital certificates are also conceivable. Both symmetric and asymmetric encryption technologies as well as public key infrastructures can be used for this purpose. It goes without saying that in other variants, other means can also be used to generate authentic inspection signals.

The emission of the inspection signal 245 can be triggered in response to a detection of an actuation of the user input module 224 (e.g. the start button).

As described above, a first inspection data set can be sent during a first transmission phase. Based on the first inspection data set and the valid user's entitlement information item, a first valid inspection feature 230 with a plurality of feature attributes 232, 234, 236 is output. The inspection feature 230 is in particular a graphical video sequence. This can at least be displayed or run through cyclically as long as the first inspection data set is received. For example, a triangle 232 is shown with a specific size that moves with a specific speed in the direction represented by the arrow 234, while a text box 236 with the content "A, B, C" is displayed in the lower area.

As can be seen, in this embodiment a validity feature 246 with essentially identical feature attributes 248, 250, 252 (compared to the valid inspection feature) is displayed on the second display 226. In other words, the valid inspection feature 230 displayed by the first display 206 based on the available valid user's entitlement information item is similar (substantially identical) to the valid inspection feature 246 displayed by the second display 226. In a simple manner, by comparing the displayed features 230, 246, an inspector can determine that the user of the mobile user terminal 204.1 is authorized to use the service.

This becomes even clearer when looking at FIG. 2b, in which a mobile user terminal 204.3 is inspected that holds a semi-valid user's entitlement information item. In order to avoid repetitions, reference is first made to the explanations of FIG. 2a.

During the inspection process, the first inspection data set is again sent. Based on the semi-valid user's entitlement information item, the first display 206 of the mobile user terminal 204.3 (compared to the embodiment of FIG. 2a) displays a semi-valid inspection feature 230 that differs from the validity feature 246 displayed by the second display 226 in at least one second feature attribute. As can be seen, in particular triangle 248, which moves in a particular direction 250, is not displayed on the first display 206. Due to the deviation in at least one feature attribute, it is easy for an inspector to see that the user of the mobile user terminal 204.3 has a semi-valid user's entitlement information item.

In the case of a semi-valid user's entitlement information item, the inspection method may offer the option, for example, of completing the logon of the mobile user terminal 204.3 with a background system using the mobile inspection device 224.

FIG. 2c now shows an embodiment in which a mobile user terminal 204.4 is inspected that holds an invalid user's entitlement information item. In order to avoid repetitions, reference is first made to the explanations of FIGS. 2a and 2b.

During the inspection process, the first inspection data set is again sent. Due to the invalid user's entitlement information item, the first display 206 of the mobile user terminal 204.4 (compared to the embodiment of FIG. 2a or 2b) displays an invalid inspection feature 230 that differs from the validity feature 246 displayed by the second display 226 in at least one first feature attribute. As can be seen, neither triangle 248, which moves in a specific direction 250, nor text field 252 is displayed on the first display 206. For example, a background 256 with a specific color (e.g. red) can be displayed. Due to the deviation in at least one first feature attribute, it is easily apparent to a controller that the user of the mobile user terminal 204.4 has no valid user's entitlement information item. It goes without saying that in this case no separate assignment table for the invalid case can be stored, but the same invalid inspection feature 230 can always be displayed independently of the individual inspection instructions.

The user input module 244 allows in particular influencing the duration of a transmission phase and/or the content of an instruction data set. For example, feature attributes, such as motion speed or -pattern, can be influenced by pressing the user input module 244. Also, by pressing the >> or <<keys, a next or previous inspection data set can be sent. The mobile inspection device 224 is designed to change the transmitted data in response to the detection of an operation of the user input module 244.

Figure 4:
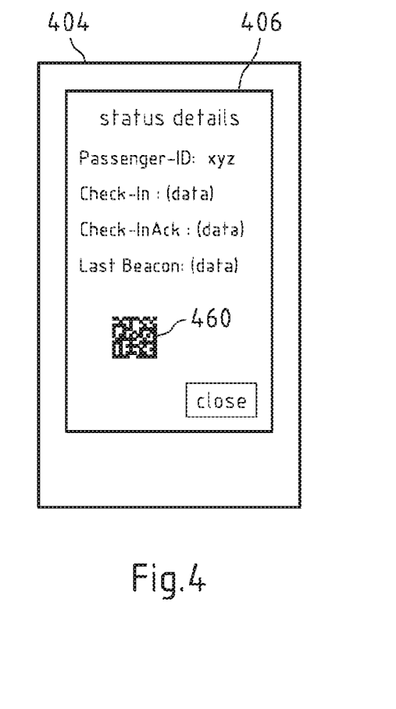
FIG. 4 is a schematic view of an embodiment of a mobile user terminal according to the present application.

FIG. 4 shows a schematic view of an embodiment of a mobile user terminal 404 in accordance with the present application, in which details of the service used are displayed on the first display 406. The display of the details, for example, is caused in response to a detection of an actuation of the key "details" 240 shown in FIGS. 2a to 2c.

For example, the passenger ID of the user can be displayed. A time stamp can also be displayed. For example, it can be displayed when the last check-in or attempted check-in to the background system took place. For example, if a check-in is unsuccessful, a timestamp may be present that proves that the user wanted to logon for the current service. In the case of a user who has installed the service usage application for the basic use of the service (or participation in the room detecting system) on his mobile user terminal 404, but has not logged-on for the currently inspected service to the background system, this time stamp can be before the start of the service provision (e.g. before the start of the current trip). For example, a check-in timestamp from last week may be displayed.

Another timestamp can also be displayed when the last receipt message "check-in acknowledgment" was received from the background system: With a successful check-in, this is typically a few seconds after the check-in process itself. If the check-in is unsuccessful, the acknowledgement message can usually be missing.

In the case of a user who has installed the service usage application for participation in the room detecting system but has not logged-on for the currently checked service, the time stamp can also be before the start of the service provision (e.g. before the start of the current trip). For example, a check-in acknowledgement from last week can be displayed there. It is also possible to display a time stamp indicating when the last presence message was received from the detection unit, in particular the last beacon signal from the detection unit.

At least some of these data can preferably be displayed together in an optical code 460 (e.g. QR code or bar code) on the display 406 so that they can be read by the mobile inspection device of the inspector. The mobile inspection device can be equipped with an appropriate scanner module for optical codes and/or with a camera.

The optical code, the data content of which, according to the foregoing, may also contain data representing the identification of the user in the background system, may be used in particular to enable an inspector to detect the data of a user using the transport service illegitimately. The mobile inspection device of the inspector can forward this data to the background system, in particular to follow up the process according to the terms of use.

It goes without saying that an illegitimate user who does not carry a mobile user terminal at all or whose mobile user terminal has not installed a service usage application for the basic use of the service can be detected by the inspector in another way.

The optical code may also be used to send the data of a user who has unsuccessfully logged-on to the background system to the background system through the mobile inspection device of the inspection.

What is claimed is:

1. An inspection method for inspecting a user's entitlement for the use of a service, in particular a transport service, comprising:
    sending, by a mobile inspection device, at least one first inspection data set during a first transmission phase,
    receiving, by at least one mobile user terminal to be inspected, the at least one first inspection data set,
    outputting, by at least one first output module of the mobile user terminal, at least one first inspection feature during the first transmission phase, based on the received first inspection data set and at least one user's entitlement information item available in the mobile user terminal, wherein the receiving of the first inspection data set on the mobile user terminal having an available user's entitlement information item triggers a playback of a first graphical sequence as the first inspection feature,
    outputting, by at least one second output module of the mobile inspection device, at least one first validity feature corresponding to the first inspection data set during the first transmission phase for visual comparison with the first inspection feature output by the at least one mobile user terminal,
    sending, by the mobile inspection device, at least one second inspection data set during a second transmission phase following the first transmission phase,
    receiving, by at least the mobile user terminal, the at least one second inspection data set,
    outputting, by the first output module, at least one second inspection feature during the second transmission phase based on the received second inspection data set and the user's entitlement information item available in the mobile utility terminal, and
    outputting, by the second output module, at least one second validity feature corresponding to the second inspection data set during the second transmission phase.

2. The inspection method according to claim 1, wherein a duration of at least the first transmission phase is controlled by a random generator of the mobile inspection device.

3. The inspection method according to claim 1, wherein a duration of at least the first transmission phase is controlled in response to a detected actuation of at least one user input module of the mobile inspection device.

4. The inspection method according to claim 1, wherein at least one of the at least one first inspection feature is of the same kind as the at least one second validity feature if a valid user's entitlement information item is available.

5. The inspection method according to claim 1, wherein at least one of the at least one first inspection feature differs in at least one first feature attribute from the at least one second validity feature if an invalid user's entitlement information item is available.

6. The inspection method according to claim 1, wherein at least one of the at least one first inspection feature differs from the at least one second validity feature in at least one second feature attribute if a semi-valid user's entitlement information item is available.

7. The inspection method according to claim 1, wherein at least one of the at least one first inspection feature is an acoustic inspection feature in the form of an acoustic sequence.

8. The inspection method according to claim 1, wherein the at least one first validity feature is a graphical validity feature in the form of a graphical sequence.

9. The inspection method according to claim 1, wherein the at least one first inspection feature is formed from a plurality of feature attributes,
    wherein the plurality of feature attributes are classified into a plurality of classes, and
    the plurality of classes including at least two of the following classes:
        form of at least one object to be displayed,
        size of at least one object to be displayed,
        color of at least one object to be displayed,
        movement pattern of at least one object to be displayed,
        speed of movement of at least one object to be displayed,
        background color,
        tone or tone sequence.

10. The inspection method according to claim 9, wherein the first inspection data set contains a plurality of inspection instructions, wherein a plurality of feature attributes are stored in the mobile user terminal, each feature attribute being assigned to an inspection instruction; and wherein the graphical sequence is formed based on the inspection instructions of the received first inspection data set.

11. The inspection method according to claim 10, wherein the assignment of an inspection instruction to a feature attribute depends on a validity status of the user's entitlement information item.

12. The inspection method according to claim 1, wherein a control data set is sent before the first transmission phase during an inspection start phase, and if the control data set is received by at least one mobile user terminal, the at least one mobile user terminal is set into an inspection mode.

13. The inspection method according to claim 1, further comprising sending, by the mobile inspection device, at least one reference ticket data set together with an inspection set, and
wherein the outputting, by the first output module, of the at least one first inspection feature is further based on the received reference ticket data set.

14. An inspection method for inspecting a user's entitlement for the use of a service, in particular a transport service, comprising:
sending, by a mobile inspection device, at least one reference ticket data set together with at least one first inspection data set during a first transmission phase,
receiving, by at least one mobile user terminal to be inspected, the at least one reference ticket data set and the at least one first inspection data set,
outputting, by at least one first output module of the mobile user terminal, at least one first inspection feature during the first transmission phase, based on the received first inspection data set, the received reference ticket data set and at least one user's entitlement information item available in the mobile user terminal, wherein the receiving of the first inspection data set on the mobile user terminal having an available user's entitlement information item triggers a playback of a first graphical sequence as the first inspection feature, and
outputting, by at least one second output module of the mobile inspection device, at least one first validity feature corresponding to the first inspection data set during the first transmission phase for visual comparison with the first inspection feature output by the at least one mobile user terminal.

15. An inspection method for inspecting a user's entitlement for the use of a service, in particular a transport service, comprising:
sending, by a mobile inspection device, at least one first inspection data set during a first transmission phase, wherein a duration of the first transmission phase is controlled by a random generator of the mobile inspection device,
receiving, by at least one mobile user terminal to be inspected, the at least one first inspection data set,
outputting, by at least one first output module of the mobile user terminal, at least one first inspection feature during the first transmission phase, based on the received first inspection data set and at least one user's entitlement information item available in the mobile user terminal, wherein the receiving of the first inspection data set on the mobile user terminal having an available user's entitlement information item triggers a playback of a first graphical sequence as the first inspection feature, and
outputting, by at least one second output module of the mobile inspection device, at least one first validity feature corresponding to the first inspection data set during the first transmission phase for visual comparison with the first inspection feature output by the at least one mobile user terminal.

\* \* \* \* \*